United States Patent [19]

Masamoto et al.

[11] 4,391,741

[45] Jul. 5, 1983

[54] POLYOXYMETHYLENE COMPOSITION

[75] Inventors: Junzo Masamoto; Minoru Hamada, both of Kurashiki; Isamu Suzuki, Kawasaki; Takeo Yoshida, Kurashiki, all of Japan

[73] Assignee: Asahi Kasei Kogyo Kabushiki Kaisha, Osaka, Japan

[21] Appl. No.: 51,417

[22] Filed: Jun. 25, 1979

Related U.S. Application Data

[63] Continuation of Ser. No. 884,223, Mar. 7, 1978, abandoned.

[30] Foreign Application Priority Data

Mar. 10, 1977 [JP] Japan .................................. 52-25415

[51] Int. Cl.$^3$ ............................................. H01B 1/06
[52] U.S. Cl. .............................. 252/511; 260/DIG. 17
[58] Field of Search ................. 252/511; 524/543, 515, 524/495; 260/DIG. 17, DIG. 19

[56] References Cited

U.S. PATENT DOCUMENTS

| 3,235,772 | 2/1966 | Gurin | 252/511 |
| 3,377,313 | 4/1968 | Jupa et al. | 260/37 AL X |
| 3,775,715 | 3/1974 | Cherdron et al. | 260/823 |
| 3,969,313 | 7/1976 | Aishima et al. | 260/37 AL |

FOREIGN PATENT DOCUMENTS 49-37946  9/1974  Japan ............................ 260/37 AL

OTHER PUBLICATIONS

*The Condensed Chemical Dictionary* (8th Ed.), Gessner G. Hawley, New York; (1971), p. 707.

Primary Examiner—J. L. Barr
Attorney, Agent, or Firm—Armstrong, Nikaido, Marmelstein & Kubovcik

[57] ABSTRACT

A polyoxymethylene composition comprising (a) 100 parts by weight of polyoxymethylene, (b) 2 to 15 parts by weight of electrically conductive carbon black, and (c) 2 to 20 parts by weight of low-density polyethylene has excellent antistatic properties. Shaped articles produced by the polyoxymethylene composition show excellent effects on preventing noise due to static electricity and adhesion of dust.

7 Claims, No Drawings

POLYOXYMETHYLENE COMPOSITION

This is a continuation of application Ser. No. 884,223, filed Mar. 7, 1978, abandoned.

BACKGROUND OF THE INVENTION

This invention relates to a polyoxymethylene composition having excellent antistatic properties.

Acetal resins such as polyoxymethylene are widely used in automobile parts, in parts for electrical appliances and sound equipment, and the like due to their excellent physical and chemical strengths, creep resistance, low abrasion and friction, good electrical properties and the like. But when they are used in sliding type parts, various problems in practical use often arise due to the generation of static electricity caused by friction. For example, polyoxymethylene is used in tension arms and wheels of a tape recorder, but the generation of static electricity caused by sliding results in adhesion of dust and generation of electrical noise, which remarkably reduces commercial value of the tape recorder.

It is well known in the art that the addition of carbon fibers to polyoxymethylene provides a composition having excellent abrasion and friction properties and antistatic properties. Such a composition can be available commercially but it is not used widely since carbon fibers are very expensive and the composition can be used in very limited special fields. Therefore, polyoxymethylene having excellent abrasion and friction properties and antistatic properties with low cost has long been desired.

The inventors of this invention tried to add electrically conductive carbon black to polyoxymethylene in order to give antistatic properties to polyoxymethylene, but the thermal stability of the polymer remarkably reduced when a sufficient amount of the carbon black for giving the desired antistatic properties was added to the polymer. In some cases, the preparation of a polyoxymethylene composition was impossible. The present inventors have found that when low-density polyethylene was added to polyoxymethylene together with electrically conductive carbon black, reduction of thermal stability of the resulting mixture was prevented and that there was obtained a polyoxymethylene composition having remarkably low surface electrical resistance and surface charge voltage half life, excellent abrasion and friction properties, and the like, and accomplished this invention.

SUMMARY OF THE INVENTION

This invention provides a polyoxymethylene composition comprising (a) 100 parts by weight of polyoxymethylene,
(b) 2 to 15 parts by weight of electrically conductive carbon black, and
(c) 2 to 20 parts by weight of low-density polyethylene.

DETAILED DESCRIPTION OF THE INVENTION

The term "electrically conductive carbon black" means carbon blacks having excellent electrical conductivity. Carbon blacks having small particle size or large surface area together with developed chain structure are preferable. In general, it seems that three basic properties of carbon black affect the electrical conductivity of carbon black compounded polymers. These three basic properties are aggregate size, aggregate shape (structure) and porosity. Smaller carbon black aggregates or carbon black aggregates composed of porous particles reduce inter-aggregate distances resulting in high conductivity. Carbon black of irregularly shaped aggregates (high structure) provides an effective electron path through the compound resulting in high conductivity. The higher surface area and oil absorption amount become, the higher the porosity becomes. In general, higher porosity gives higher electrical conductivity but due to the mutual complicated influence of the aggregate size and aggregate shape, this cannot be said in all cases.

Preferable examples of the electrically conductive carbon black are oil furnace blacks, furnace blacks, acetylene blacks, and the like. Commercially available electrically conductive carbon blacks are KETJEN Black EC (trade name) having a $N_2$ surface area of 1000 $m^2/g$ and dibutyl phthalate (D.B.T.) absorption of 340 cc/100 g (manufactured by AKZO Co.), Conductex Black SC (trade name) having a $N_2$ surface area of 200 $m^2/g$ and D.B.T. absorption of 110 cc/100 g (manufactured by Columbian Carbon Co., Inc.), Vulcan XC-72R (trade name) having a $N_2$ surface area of 254 $m^2/g$ and D.B.T. absorption of 185 cc/100 g (manufactured by Cabot Corp.), and the like.

The electrically conductive carbon black is used in an amount of 2 to 15 parts by weight, preferably 4 to 10 parts by weight, per 100 parts by weight of polyoxymethylene. The amount of the carbon black is adjusted by considring the required antistatic properties and other physical properties of the final composition. If the amount is less than 2 parts by weight, sufficient antistatic properties cannot be obtained, while if the amount is more than 15 parts by weight, mechanical properties are remarkably lowered and there are produced various problems in practical use. More in detail, when the amount of the electrically conductive carbon black is 2 to 4 parts by weight per 100 parts by weight of polyoxymethylene, surface resistance reduces to $10^{15}$–$10^{13}\Omega$ comparing with conventional polyoxymethylene of more than $10^{16}\Omega$. Such a value shows considerable effect on preventing adhesion of dust due to the generation of static electricity. When the amount of the electrically conductive carbon black is 4 to 5 parts by weight or more per 100 parts by weight of polyoxymethylene, surface resistance is remarkably lowered to about $10^7\Omega$ or less and surface charge voltage half life is lowered to zero second comparing with conventional polyoxymethylene of more than 200 seconds. This means remarkably excellent antistatic properties and prevention of noise due to the generation of static electricity can effectively be attained.

The term "low-density polyethylene" means polyethylene produced by the so-called high pressure method having a density of 0.91 to 0.94 $g/cm^3$. In the high pressure method, by-produced wax-like polyethylene having lower molecular weight can also be used and included in this invention but moldability in extrusion is slightly lowered or mechanical properties of molded articles are slightly lowered. Since a decrease in the molecular weight lowers mechanical properties of molded articles, there is generally used low-density polyethylene having a molecular weight in terms of melt index (MI) of 0.1 g/10 min. to 2000 g/10 min., preferably 2 g/10 min. to 400 g/10 min., more preferably 5 g/10 min. to 200 g/10 min.

Low-density polyethylene is used in an amount of 2 to 20 parts by weight, preferably 5 to 15 parts by weight, per 100 parts by weight of polyoxymethylene. The amount of low-density polyethylene is adjusted by considering the amount of the electrically conductive carbon black in the composition. In other words, a minimum amount of low-density polyethylene in order to maintain thermal stability of the composition can be determined depending on the kind and the amount of electrically conductive carbon black to be added. In any cases, if the amount of low-density polyethylene is less than 2 parts by weight, sufficient thermal stability of the composition cannot be attained, while if the amount is more than 20 parts by weight, physical and chemical properties of polyoxymethylene are gradually or in some cases rapidly lowered.

On the other hand, high-density polyethylene has no effect on improving thermal stability of the composition which includes electrically conductive carbon black. This is a very surprising thing. Other ethylenic copolymers such as ethylene-vinyl acetate copolymer, thermoplastic polyesters and the like do not show such an effect of improving thermal stability of the composition.

The term "polyoxymethylene" used in this invention includes a polyoxymethylene homopolymer and polyoxymethylene co- or terpolymers containing a large proportion of oxymethylene chains in the principal chain.

Polyoxymethylene can be prepared by polymerization of formaldehyde, or a cyclic oligomer of formaldehyde such as trioxane, tetraoxane, or the like, alone or by copolymerization of formaldehyde or its oligomer as mentioned above with one or more copolymerizable monomers such as ethylene oxide, 1,3-dioxolane, 1,4-butanediol formal, and diethylene glycol formal. In order to stabilize the homopolyoxymethylene, hydroxyl end groups in the polymers are modified by conventional methods, e.g. acetylation of end groups with acetic anhydride, etherification, and reaction with isocyanates. In the case of the copolymers, unstable fractions of oxymethylene units of the polymer chain ends are unzipped to form thermally stable functional group units, e.g. oxyethylene units. Antioxidants and other stabilizers can also be added to the polymers for the stabilization. Polyoxymethylene having weight average molecular weight of 30,000 to 200,000 is preferably used and that having higher molecular weight can also be used if required.

The composition of this invention can include conventional additives such as esters, pigments and dyes, thermal stabilizers, antioxidants, etc.

The composition of this invention can be prepared by using conventional methods for preparing conventional polyoxymethylene compositions. For example, polyoxymethylene, a stabilizer, other additives, electrically conductive carbon black, and low-density polyethylene are mixed at once in a mixer such as a Henschel mixer, a cone blender, or the like and subsequently the resulting mixture is blended in a conventional extruder at a cylinder temperature of 190°–200° C. and granulated. Alternatively, low-density polyethylene and electrically conductive carbon black are mixed in a Banbury mixer and subsequently the resulting mixture is blended with polyoxymethylene in an extruder.

The thus obtained composition of this invention can be molded into various molded articles by injection molding, compression molding, and the like. For example, when the composition of this invention is molded into tension arms, pulleys, wheels of tape recorders, bobbin ringers of spinning and weaving machinery, and the like, there are shown excellent effects on preventing the generation of noise caused by static electricity, preventing adhesion of dust, and the like.

The amount of low-density polyethylene in the composition is practically determined by considering a balance to the amount of electrically conductive carbon black. For example, if 4–6 parts by weight of electrically conductive carbon black is added to 100 parts by weight of polyoxymethylene, the amount of low-density polyethylene is preferably 10–15 parts by weight from viewpoint of thermal stability and physical properties of the composition. Further since the molecular weight of low-density polyethylene seems to influence antistatic properties of the composition of this invention, it is preferable to use low-density polyethylene having smaller molecular weight, e.g. melt index (M.I.) of 80. This is clearly shown in Examples 5 and 7 mentioned hereinafter.

As mentioned above, the addition of low-density polyethylene to a mixture of polyoxymethylene and electrically conductive carbon black which mixture is remarkably thermally unstable makes the mixture thermally stable in practical use and also affords excellent abrasion and friction properties to the resulting composition. It is a very surprising thing that high-density polyethylene does not show this effect as shown in Example 2 and Comparative Example 2 mentioned hereinafter.

This invention is explained in more detail by way of the following examples, in which all parts and percents are by weight unless otherwise specified.

EXAMPLE 1, COMPARATIVE EXAMPLE 1

To a mixture of 100 parts of polyoxymethlene diacetate (MI≃14.5 g/10 min. measured according to ASTM D-1238, load 2160 g, at 190° C.: the same method was used in the following examples), 0.3 part of 2,2'-methylene-bis-(4-methyl-6-tert-butylphenol) and 0.8 part of copolymerized polyamide of hexamethyleneadipoamide 35% hexamethylene-sebacoamide 27% caprolactam 38% (hereinafter referred to as "PA"), were added 6.0 parts of electrically conductive carbon black (trade name, KETJEN Black EC, manufactured by AKZO Co.) and 12 parts of low-density polyethylene (MI≃50 g/10 min., density 0.917 g/cm$^3$). The resulting composition was blended in a 50 mm$\phi$ extruder at 200° C. and granulated. Test plates of 130 mm long, 110 mm wide and 5 mm high were then molded therefrom. Surface electrical resistance was measured at 20° C. according to ASTM D257. Surface charge voltage half life was measured by using an Honest Meter manufactured by Shishido Seisakusho Ltd. by charging the surface at 1000 volts.

For comparison, a mixture containing no carbon black and no low-density polyethylene was prepared and tested in the same manner as mentioned above.

The results are as shown in Table 1. As is clear from Table 1, antistatic properties are remarkably improved.

TABLE 1

|  | Example 1 | Comparative Example 1 |
|---|---|---|
| Surface electrical resistance (Ω) | 1.9 × 10$^6$ | >10$^{16}$ |
| Surface charge vol- | 0 | 225 |

TABLE 1-continued

|  | Example 1 | Comparative Example 1 |
|---|---|---|
| tage half life (sec) |  |  |

EXAMPLE 2, COMPARATIVE EXAMPLES 2-4

To a mixture of 100 parts of polyoxymethylene diacetate (MI≃14.5 g/10 min.), 0.75 part of PA and 0.3 part of 2,2'-methylene-bis-(4-methyl-6-tert-butylphenol), additives as listed in Table 2 were added. The resulting compositions were blended, granulated and tested in the same manner as described in Example 1.

The results are as shown in Table 2.

It was a surprising thing that blending of a mixture of polyoxymethylene and KETJEN Black EC became possible only by addition of low-density polyethylene. Further, lowering of thermal stability of the compositions was inevitable when a polymer other than low-density polyethylene, i.e. ethylene-vinyl acetate copolymer, high-density polyethylene, and a thermoplastic polyester, was added to the mixture.

EXAMPLES 3-10, COMPARABLE EXAMPLE 5

To a mixture of 100 parts of polyoxymethylene diacetate (MI≃15.2 g/10 min.), 0.75 part of a copolyamide having a melting point of 165° C., and 0.3 part of 2,2'-methylene-bis-(4-methyl-6-tert-butylphenol), additives as listed in Table 3 were added. The resulting compositions were blended, granulated and tested in the same manner as described in Example 1. Further, tests using a thrust friction tester were also carried out.

The results are as shown in Table 3.

TABLE 3

|  | Example 3 | Example 4 | Example 5 | Example 6 | Example 7 | Example 8 | Example 9 | Example 10 | Comparative Example 5 |
|---|---|---|---|---|---|---|---|---|---|
| Additives (parts) |  |  |  |  |  |  |  |  |  |
| KETJEN Black EC | 2.0 | 4.0 | 5.25 | 6.0 | 5.25 | 5.25 | 3.0 | 5.25 | — |
| Low-density polyethylene (MI ≃ 80 g/10 min, d 0.916 g/cm$^3$) | 12.0 | 12.0 | 12.0 | 12.0 | — | — | — | 12.0 | — |
| Low-density polyethylene (MI ≃ 12 g/10 min, d 0.919 g/cm$^3$) | — | — | — | — | 12.0 | — | — | — | — |
| Low-density polyethylene (MI ≃ 4 g/10 min, d 0.927 g/cm$^3$) | — | — | — | — | — | 12.0 | 8.0 | — | — |
| $C_{18}H_{37}O(CH_2CH_2O)_nH$ (n ≃ 7) | — | — | — | — | — | — | — | 2.0 | — |
| Surface electrical resistance (Ω) | $1.0 \times 10^{13}$ | $4.0 \times 10^{12}$ | $1.4 \times 10^6$ | $1.2 \times 10^6$ | $2.1 \times 10^6$ | $3.3 \times 10^6$ | $2.0 \times 10^{12}$ | $1.0 \times 10^6$ | $>10^{16}$, $10^{16}$ |
| Surface charge voltage half life (sec) | 150 | 50 | 0 | 0 | 11 | 48 | 100 | 0 | 250 |
| PV limit* (kg/cm · sec) | — | — | 800 | 750 | 800 | 850 | — | — | 600 |
| Friction coefficient* (μ) | — | — | 0.35 | 0.32 | 0.33 | 0.30 | — | — | 0.36 |

Note to Table 3:
*Measurements according to the Suzuki method by using a thrust friction tester:
(1) Opposite material, steel S 45 C
(2) Surface pressure, 20 kg/cm$^2$
(3) Friction coefficient is the mean value measured at linear speed of 0.5, 2, 6, and 20 cm/sec.
A PV value is the product of the load and the running speed. The PV limit is the highest PV value that can be tolerated for satisfactorily sustained operation.

As is clear from the results in Table 3, the composition of this invention (e.g. Example 5) does not show any lowering in PV limit and friction coefficient comparing with conventional polyoxymethylene (Comparative Example 5), and also shows excellent antistatic properties.

These results show that the composition of this invention is suitable for producing sliding type parts such as tension arms of tape recorders which require prevention of noise caused by the generation of static electricity and excellent friction properties.

TABLE 2

|  | Example 2 | Comparative Example 2 | Comparative Example 3 | Comparative Example 4 |
|---|---|---|---|---|
| Additives (parts) |  |  |  |  |
| KETJEN Black EC | 5 | 5 | 5 | 5 |
| Low-density polyethylene (MI ≃ 50 g/10 min, density 0.917 g/cm$^3$) | 12 | — | — | — |
| High-density polyethylene (MI ≃ 12 g/10 min, density 0.95 g/cm$^3$) | — | 12 | — | — |
| Thermoplastic polyester *1 | — | — | 12 | — |
| Ethylene-vinyl acetate copolymer *2 (MI ≃ 70 g/10 min) | — | — | — | 12 |
| Surface electrical resistance (Ω) | $1.4 \times 10^6$ | Extrusion was impossible due to decomposition. | | |
| Surface charge voltage half life (sec) | 0 | | | |

Note
*1: Trade name Perublen P40B, consisting of terephthalic acid, ethylene glycol, and polytetramethylene glycol units, manufactured by Toyobo Co., Ltd.
*2: Vinyl acetate content 10%

EXAMPLES 11–14, COMPARATIVE EXAMPLE 6

To a mixture of 100 parts of a copolymer of trioxane (98%) and ethylene oxide (2%) (MI≃9 g/10 min.), 0.4 part of 2,2'-methylene-bis-(4-methyl-6-tert-butylphenol), 0.03 part of melamine, and 0.1 part of cyanoguanidine, additives as listed in Table 4 were added. The resulting compositions were blended, granulated and tested in the same manner as described in Example 1 and Examples 3–10.

The results are as shown in Table 4.

TABLE 4

| | Example 11 | Example 12 | Example 13 | Example 14 | Comparative Example 6 |
|---|---|---|---|---|---|
| Additives (parts) | | | | | |
| KETJEN Black EC | 2.0 | 4.0 | 5.0 | 10.0 | — |
| Low-density polyethylene (MI ≃ 80 g/10 min, d 0.916 g/cm$^3$) | 5.0 | 10.0 | 12.0 | 18.0 | — |
| Surface electrical resistance (Ω) | $5.0 \times 10^{13}$ | $3.0 \times 10^{12}$ | $3.0 \times 10^6$ | $2.0 \times 10^5$ | $>10^{16}$ |
| Surface charge voltage half life (sec) | 180 | 60 | 0 | 0 | 265 |
| Friction coefficient* ($\mu$) | — | — | 0.35 | — | 0.37 |
| PV limit* (kg/cm · sec) | — | — | 700 | — | 600 |

Note
*The same as the footnote of Table 3.

What is claimed is:

1. A composition comprising:
   (a) 100 parts by weight of polyoxymethylene,
   (b) 4 to 10 parts by weight of electrically conductive carbon black selected from the group consisting of oil furnace blacks, furnace blacks and acetylene blacks, and
   (c) 10 to 18 parts by weight of low-density polyethylene, wherein said composition has a surface electrical resistance of $10^{13}$ ohms or less.

2. A composition according to claim 1, wherein polyoxymethylene is a homopolymer of formaldehyde, trioxane or tetraoxane, having stabilized end groups.

3. A composition according to claim 1, wherein polyoxymethylene is a copolymer or terpolymer of formaldehyde, trioxane or tetraoxane with one or more copolymerizable monomers.

4. A composition according to claim 1, wherein polyoxymethylene has weight average molecular weight of 30,000 to 200,000.

5. A composition according to claim 1, wherein low-density polyethylene has a melt index measured according to ASTM D-1238 of 2 g/10 min. to 400 g/10 min.

6. A composition according to claim 1, which contains
   (b) 4 to 6 parts by weight of electrically conductive carbon black, and
   (c) 10 to 15 parts by weight of low-density polyethylene per 100 parts by weight of polyoxymethylene.

7. A composition according to claim 1, wherein the amount of electrically conductive carbon black is 4 to 10 parts by weight.

* * * * *